3,519,949
OPTICAL PUMPING CELLS
Léon Malnar, Henri Brun, Albert Lusson, and Jacques Bisjak, Paris, France, assignors to CSF-Compagnie Generale de Telegraphie Sans Fil, a corporation of France
Filed Mar. 10, 1966, Ser. No. 533,180
Claims priority, application France, Mar. 22, 1965, 10,140
Int. Cl. H03b 3/12
U.S. Cl. 331—3     8 Claims

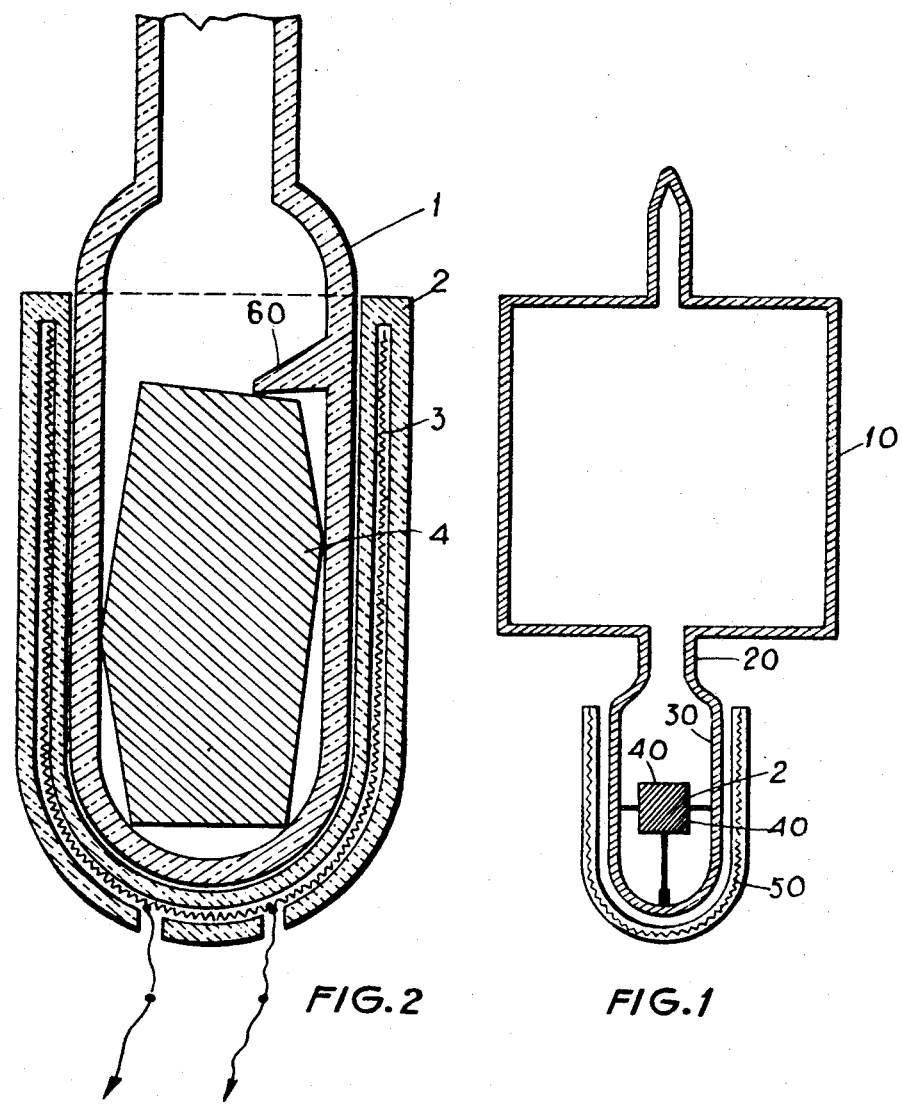

ABSTRACT OF THE DISCLOSURE

The disclosure is of cells filled with an alkali vapour and used in optical pumping devices. The cell comprises a vessel communicating with a bulb wherein an alkali graphite compound is provided. By means of a heating device, the alkali graphite compound supplies to the vessel an alkali vapour having a pressure substantially lower than the pressure which would be supplied by the alkali metal alone.

---

Figure 3:
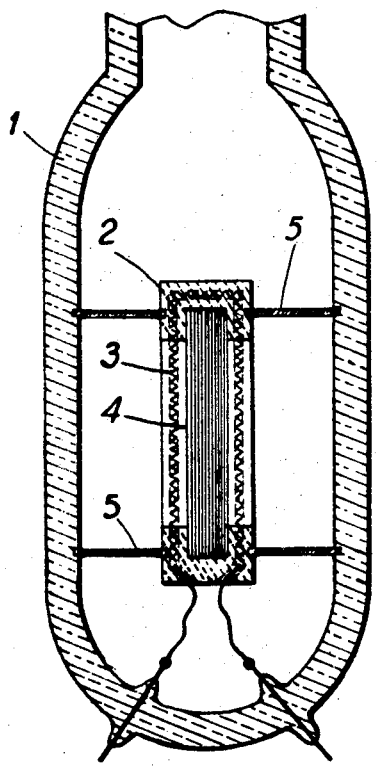

High stability atomic clocks and highly sensitive magnetometers whose operation is based on the optical pumping of an alkali vapour are well known.

The optical pumping consists in irradiating atoms with a monochromatic light, which is capable of inverting the atomic population of certain energy levels.

This population inversion is necessary for making apparent the resonance, which appears when a radioelectric field having a suitable frequency is applied to the atoms of the alkali vapour. This resonance is optically detected due to the variation of the intensity of light propagating through the optically pumped vapour.

For known apparatus, there exists a maximum operating temperature which is determined by the nature of the phenomenon. In order to be detectable, the paramagnetic resonance requires an optimum density of the alkali vapour. If the density is too low, too few atoms undergo optical pumping and the resonance phenomena cannot be detected. If, on the other hand, the density is too high, collisions between atoms adversely affect the optical pumping and the population inversion caused by the pumping light drops due to insufficient pumping. The optimum vapour tension is of the order of $10^{-6}$ mm. Hg for rubidium and $10^{-5}$ mm. Hg for cesium. The vapour contained in the resonance cell is saturant, that is to say, it is in equilibrium with a liquid or solid phase. Thus the condensation of vapour on the glass walls tends to take place when the temperature drops; this results in the lowering of the pressure which is to be compensated by the evaporation of the liquid or solid phase.

It is therefore desirable to keep the temperature at the optimum level for the operation, namely that at which the vapour is saturant at optimum pressure, and this value is about 40° C. for cesium and for rubidium.

In atomic clocks and magnetometers, the temperature of the resonance cell is held at the optimum level by a thermostat. Yet a thermostat system, while it can readily prevent cooling by giving off a certain amount of heat, is not quite as effective for cooling a body whose temperature is too high. This is the reason why apparatus based on optical pumping should be used at a temperature not exceeding 35° C. or 40° C. and this presents a serious drawback.

It is an object of this invention, to provide an optical pumping cell in which this drawback is avoided.

According to the invention, there is provided an optical pumping device comprising a cell, a bulb, a channel connecting said cell to said bulb, in said bulb, a compound of carbon and an alkali metal, and a heating arrangement for heating said compound.

For a better understanding of the invention and to show how the same may be carried into effect reference will be made to the drawing accompanying the following description and wherein:

FIG. 1 diagrammatically shows the arrangement according to the invention; and

FIGS. 2 to 5 are axial sections of embodiments of the invention.

The same reference numerals designate the same parts in all the figures.

FIG. 1 shows an optical pumping cell 10. This cell communicates through a channel 20 with a chamber or bulb 30. According to the invention, this chamber contains a bar 40 of a specific compound of carbon and an alkali metal, for example cesium octocarbide $CsC_8$. The chamber 30 is surrounded by a heating arrangement 50.

The assembly operates as follows:

In the compound $CsC_8$, for example, the alkali metal is located between the mesh of the crystal network of the graphite. Above the compound, an alkali metal vapour is formed. Its tension is much lower at the same temperature than that of the saturant vapour of the pure metal.

The equilibrium obtained between the vapour of the alkali metal and the alkali graphite-metal compound is reversible so that, with rising temperature, the vapour tension rises and if the temperature drops, the graphite-metal compound absorbs the excess of the vapour phase which results in the drop of the vapour tension.

In the case of rubidium, the temperature of the compound, necessary for obtaining the optimum vapour tension, is of the order of 400° C., and in the case of cesium it is 370° C.

In order to achieve the optimum condition, the compound is to be heated to this temperature, which is high, so that only a heating source is necessary since the ambient medium is always at a lower temperature.

FIG. 2 shows a first embodiment of the chamber 30 according to the invention. It comprises a glass wall 1, surrounded by a ceramic jacket 2 equipped with a heating resistance 3.

Within the chamber, the carbon and alkali compound 4 in the form of a solid is deposited. The same is held in place by a lip 60 formed in the chamber wall.

This arrangement has the disadvantage of a certain heat dissipation in the glass.

In FIG. 3, the bar 4 of carbon-alkali metal compound is held in a widely open support of ceramic material, in which a heating resistance 3 is arranged. The whole is held in place in the chamber by means of mica supports 5. The resistance 3 is supplied through two terminals A and B.

Figure 4:
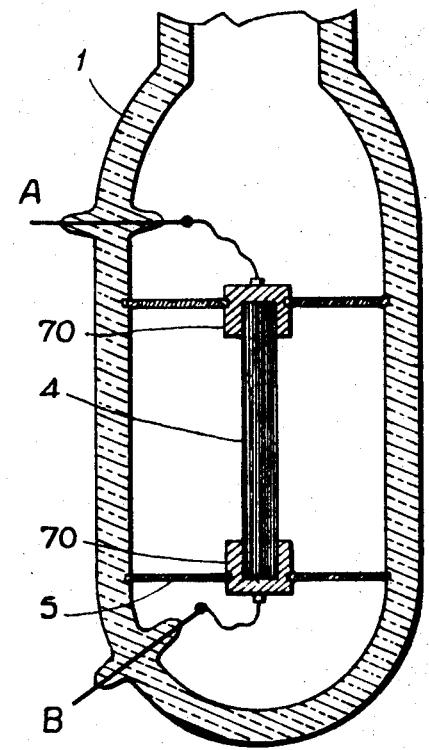

In the system of FIG. 4, the bar 4 is heated directly by means of an electric current flowing therethrough. It is connected to a supply source by two terminals A and B. The bar is mounted between two supports 70, fixed to mica members 5.

Figure 5:
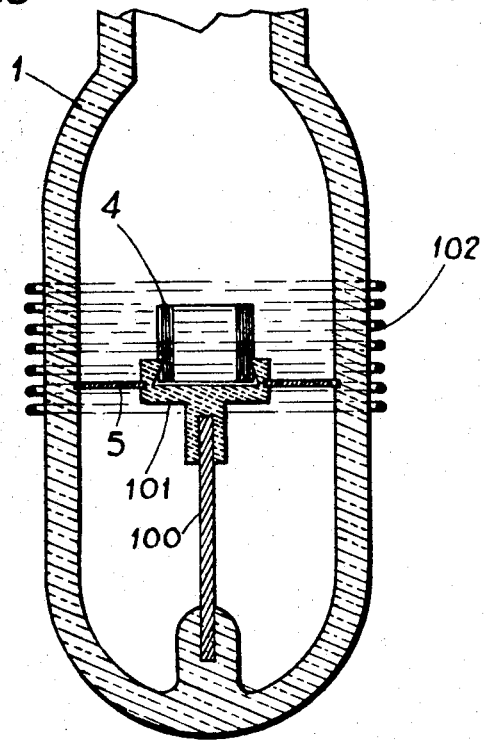

In the system of FIG. 5, the carbon-alkali metal compound 4 has the shape of a ring which is supported in the chamber by means of a rod 100 which carries a ceramic support 101. The rod 100 is a poor thermal conductor. The mounting in the chamber is completed by a mica support 5.

The chamber is surrounded by a winding 102. This winding is connected to a high-frequency source (not shown). In this system, the heat liberated by induction is concentrated in the part to be heated and especially the glass of the chamber is not subjected to heating.

According to the invention, a thermostat can hold the temperature of the resonance cell at a suitable value, i.e., at about of 400° C. for rubidium and 370° C. for cesium.

The arrangement makes it therefore possible to effect a transposition in the operating temperature domain.

For obtaining the same vapour tension of rubidium of $10^{-6}$ mm. Hg, pure rubidium has to be heated to 40° C., while the graphite-rubidium compound has to be heated to 400° C. The graphite acts as reservoir for the alkali metal which liberates the metal with the correct density in a reversible manner only at 400° C. and which recovers it again at a lower temperature.

It should be noted that only the chamber needs to be heated to the required temperature. The rest of the vessel need not be heated to any regulated temperature. It is sufficient to keep it at a higher temperature than that corresponding to the saturant vapour tension of the alkali metal for avoiding condensation of the metal on the walls.

The arrangement is suitable for magnetometers and atomic clocks with optical pumping of alkali vapours, rubidium-85 filters used in such clocks, and light sources used for optical pumping.

Of course the invention is not limited to the embodiments described and shown which were given solely by way of example.

What is claimed is:

1. An optical pumping device comprising a cell, a bulb, a channel connecting said cell to said bulb, in said bulb a compound of graphite and an alkali metal, and a heating arrangement for heating said compound.

2. A device as claimed in claim 1, wherein said compound is cesium octocarbide.

3. A device as claimed in claim 1, wherein said bulb comprises a glass wall, a ceramic jacket surrounding said wall, said arrangement comprising a heating resistance inserted in said jacket.

4. A device as claimed in claim 1, wherein said compound is shaped as a bar.

5. A device as claimed in claim 4, wherein a ceramic support carries said bar, a heating arrangement being built into said support.

6. A device as claimed in claim 4, wherein means are provided for causing an electric current to flow across said bar.

7. A device as claimed in claim 1, wherein said compound is shaped as a ring.

8. A device as claimed in claim 7, wherein a winding coaxial with said ring surrounds said bulb; said winding comprising connections to a high frequency voltage source.

References Cited

UNITED STATES PATENTS

| 3,243,721 | 3/1966 | Caldwell | 331—94 X |
| 3,248,666 | 4/1966 | Farmer | 331—94 X |
| 3,304,516 | 2/1967 | Novick et al. | 331—94 |

OTHER REFERENCES

Heslop and Robinson, Inorganic Chemistry, 1960, pp. 291 and 292.

Heslop and Robinson, Inorganic Chemistry, 2nd ed., 1963, pp. 298 and 299.

J. SPENCER OVERHOLSER, Primary Examiner

R. S. ANNEAR, Assistant Examiner

U.S. Cl. X.R.

331—94; 313—110; 324—0.5; 266—1